Patented Dec. 3, 1946

2,411,869

UNITED STATES PATENT OFFICE 2,411,869

ADDITION REARRANGEMENT PRODUCTS OF THIOCYANIC ACID AND CYCLOPENTA-DIENE-OLEFINIC ADDUCTS

Herman A. Bruson, Philadelphia, Pa., assignor to The Resinous Products & Chemical Company, Philadelphia, Pa., a corporation of Delaware No Drawing. Application October 6, 1944, Serial No. 557,554

6 Claims. (Cl. 260—454)

This invention relates to addition-rearrangement products of thiocyanic acid and cyclopentadiene-mono-olefinic adducts.

Thiocyanation of organic compounds has heretofore been accomplished by replacement of a halogen atom or a sulfate or phosphate ester group by reaction with a salt of thiocyanic acid, or by addition of thiocyanogen to both sides of a multi-bonded linkage of carbon atoms, or by addition of thiocyanic acid to certain unsaturated hydrocarbons having reactive double bonds, wherein there are used inert, anhydrous organic solvents at relatively low temperatures and where no rearrangement of the hydrocarbon occurs. It has been generally held impractical to work with thiocyanic acid because it readily polymerizes at room temperature or in aqueous solutions to a yellow insoluble compound. For this reason it can be handled only in dilute, inert, anhydrous solutions; for example, ether, at ice bath temperatures, and gives very poor yields of product.

In accordance with the present invention, however, it has been found that by operating under conditions contrary to the prior art; namely, in the presence of water and at elevated temperatures, cyclopentadiene-mono-olefinic adducts can be reacted smoothly with thiocyanic acid to form good yields of new hydrothiocyanates and isothiocyanates in which a rearrangement of the initial ring system has occurred. By operating at temperatures from about 30° C. to 100° C. and in the presence of water, the rate of addition of the thiocyanic acid to the double bond is apparently greater than the rate of polymerization of the thiocyanic acid itself. Furthermore, the products obtained as a result of the reaction are not simple addition products per se formed by the addition of thiocyanic acid to the double bond, but are molecular rearrangement products formed by a rearrangement of the ring. It is remarkable that even at 90° C.–100° C. and in the presence of water only traces of polythiocyanic acid are encountered and that even in those cases where extreme susceptibility to cleavage would be expected, as, for example, in the case of esters, good yields of the rearranged hydrothiocyanates and isothiocyanates are obtained.

In effecting the reaction between the cyclopentadiene-mono-olefinic adducts and thiocyanic acid, there can be used as the source of the thiocyanate group an aqueous solution or suspension of a salt of thiocyanic acid. By way of example, there may be cited as suitable salts alkali thiocyanates including lithium, sodium, or potassium thiocyanates, alkaline earth thiocyanates, such as calcium thiocyanate, or ammonium thiocyanate. One or more of such salts may be used over a wide range of concentration. Dilute solutions up to super-saturated solutions may be employed.

To liberate thiocyanic acid from these salts, there may be used non-oxidizing mineral acids over a considerable range of concentration. Acids such as hydrochloric, sulfuric, and phosphoric are particularly suitable and may advantageously be used at concentrations from 10% to about 40% although weaker and more concentrated solutions are also useful. The acid and thiocyanic acid salt are desirably used in equivalent proportions.

In carrying out the reaction, the salt and acid are gradually combined or mixed in the presence of water and in the presence of the cyclopentadiene-mono-olefinic adduct employed. The latter may be stirred with an aqueous solution of the salt, and the acid added thereto little by little. On the other hand, the salt or a solution or a suspension thereof may be added gradually to a stirred mixture of the acid and the cyclopentadiene-mono-olefinic adduct. The latter may also be added directly to a solution of the mineral acid or of the thiocyanate salt in water or in a mixture of water and an organic solvent, particularly one miscible with water such as acetone or ethyl alcohol. Or the cyclopentadiene-mono-olefinic adduct can be dissolved in a water-immiscible solvent such as benzene, the finely powdered thiocyanate salt added thereto, and the mixture rapidly stirred while an aqueous solution of the mineral acid is gradually added thereto. This is particularly useful if the olefinic compound is a solid or is highly viscous.

According to this invention, there is thus liberated at any given moment only a relatively small amount of thiocyanic acid in a reaction medium containing water and the cyclopentadiene-mono-olefinic adduct with or without the presence of an organic solvent, at a temperature sufficiently high for the desired addition and rearrangement to occur as rapidly as the thiocyanic acid is formed, thereby practically eliminating the polymerization of the latter. For this purpose a reaction temperature between about 45° C. and 100° C. has been found most advantageous.

The process disclosed herein is applicable to a wide variety of cyclopentadiene-mono-olefinic adducts of the Diels-Alder type. For example, the process is applicable to the Diels-Alder type adducts of cyclopentadiene and the following mono-olefinic compounds; that is, compounds having an open-chained group containing a double bonded linkage between carbon atoms:

Ethylene, propylene, styrene, β-bromostyrene, allyl alcohol, allyl chloride, vinyl chloride, vinyl acetate; allyl esters such as allyl acetate, allyl oleate, allyl benzoate, allyl salicylate; allyl ethers, for example allyl phenyl ether, allyl naphthyl ether, allyl chlorophenyl ether, allyl cyclohexyl ether, allyl benzyl ether, allyl benzyl sulfide, allyl butyl sulfide; 1,2-dichloroethylene, allyl benzene, eugenol, safrol, crotonaldehyde, acrolein, methyl vinyl ketone, and other α,β-unsaturated aldehydes or ketones.

The products are useful as toxicants for the preparation of insecticides. They also possess parasiticidal activity.

In order to illustrate this invention more fully, the following examples are given.

Example 1

To a rapidly stirred mixture consisting of 46 g. of ammonium thiocyanate, 48 g. of water, and 62 g. of 2,5-endomethylene-Δ³-tetrahydro-benzyl alcohol

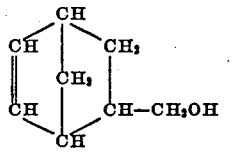

(cyclopentadiene-allyl alcohol adduct)

there was gradually added dropwise 60 g. of concentrated 35% hydrochloric acid during the course of twenty minutes while the reaction temperature was maintained at 40° C.–45° C. by means of a warm water bath. After all the hydrochloric acid had been added, the mixture was stirred for one hour longer at 40°–45° C. and allowed to stratify. The oil layer was separated by means of a little benzene and the benzene solution washed thoroughly with water, filtered from traces of polythiocyanic acid, dried, and distilled in vacuo.

The product boiling at 169°–172° C./6 mm. was a colorless oil having the properties of a saturated thiocyanate and of the corresponding isothiocyanate, indicating that the product is a mixture of thiocyanate and isothiocyanate, of the probable formula

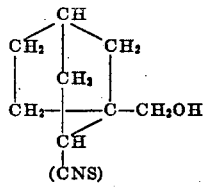

Example 2

Twenty-five grams of concentrated hydrochloric acid was added dropwise during the course of ten minutes to a rapidly stirred mixture of 20 g. of water, 20 g. of ammonium thiocyanate, and 38 g. of 2,5-endomethyl-Δ³-tetrahydrobenzyl acetate

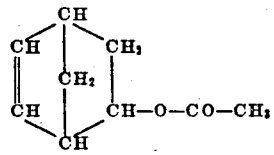

which is obtained by reacting cyclopentadiene with vinyl acetate. The reaction mixture was maintained at 90°–95° C. during the addition of the hydrochloric acid and for twenty-five minutes thereafter. The product was washed with water, filtered, and dried. The clear oil obtained was then distilled in vacuo.

The product boiling at 155°–160° C./7 mm. was a colorless oil, corresponding in composition with compounds of the probable formula

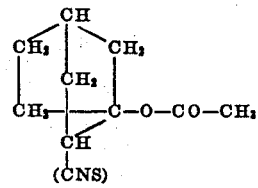

Example 3

To a rapidly stirred mixture of 50 g. of water, 48.5 g. of sodium thiocyanate, and 92 g. of 2,5-endomethylene - Δ³- tetrahydro - benzylphenyl ether

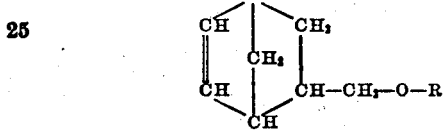

(wherein R is a phenyl nucleus, as a specific example of aromatic hydrocarbon nuclei including naphthyl, substituted phenyl, and substituted naphthyl groups) maintained at 95°–99° C., there was gradually added 60 g. of concentrated hydrochloric acid during the course of twenty minutes. The mixture was then heated further at 95° C. for twenty minutes, then washed, filtered, dried, and distilled in vacuo.

The product boiling at 180°–182° C./0.5 mm. amounted to 91 g. It was a colorless oil having the properties of an isothiocyanate of the probable formula

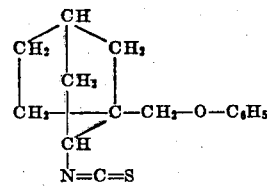

When heated with concentrated ammonium hydroxide solution, it yields the corresponding thiourea as a crystalline compound, melting at 135° C.

The 2,5-endomethylene-Δ³-tetrahydro-benzylphenyl ether used is a colorless oil boiling at 133°–136° C./6 mm. obtainable by boiling dicyclopentadiene with allyl phenyl ether.

Example 4

To a rapidly stirred mixture of 35 g. of water, 32.4 g. of sodium thiocyanate and 70.4 g. of 2,5-endomethylene - Δ³ - tetrahydrobenzyl-o-chlorophenyl ether

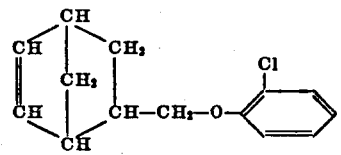

maintained at 95° C., there was added dropwise 40 g. of concentrated hydrochloric acid during the course of ten minutes. The mixture was then stirred for one hour longer at 95° C. It was cooled, taken up in benzene, filtered, and the benzene solution washed thoroughly with water. The benzene was distilled off in vacuo and the residual oil (84 g.) distilled in vacuo. The product (68 g.) boiling at 201°–204° C./1 mm. was a thick, pale yellow oil having the properties of an isothiocyanate of the probable formula

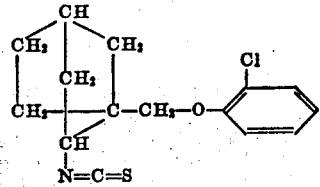

The 2,5-endomethylene-Δ³-tetrahydro-benzyl-o-chlorophenyl ether used is a colorless oil boiling at 130°–134° C./1 mm. obtainable by boiling dicyclopentadiene with allyl-o-chlorophenyl ether.

*Example 5*

A mixture of 104 g. of dicyclopentadiene and 183 g. of allyl-p-(α,α,γ,γ-tetramethyl-butyl)-phenyl ether was boiled under a reflux condenser at 160°–175° C. for eight hours, and the product then distilled in vacuo. The compound having the formula

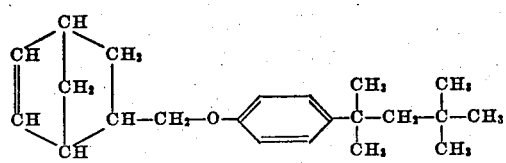

was obtained as a colorless oil boiling as 167°–172° C./1–2 mm. in a yield of 125 g. The dicyclopentadiene in this preparation apparently depolymerizes to supply cyclopentadiene which forms the adduct as indicated. This method of forming intermediates is a particularly useful and advantageous one.

The above compound (94 g.) was rapidly stirred with 35 g. of water and 32.4 g. of sodium thiocyanate at 95° C. while 40 g. of concentrated hydrochloric acid was added dropwise thereto during the course of twenty minutes. After all the acid had been added, the mixture was stirred for one hour longer at 95° C., then cooled, taken up in benzene, filtered, washed, dried, and distilled in vacuo.

The product boiling at 230°–240° C./1 mm. was a thick, pale yellow oil having the properties of an isothiocyanate of the probable formula

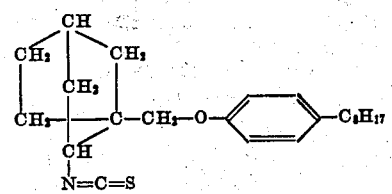

*Example 6*

To a rapidly stirred mixture of 56.7 g. of sodium thiocyanate, 60 g. of water, and 124 g. of 2,5-endomethylene-Δ³-tetrahydro-benzyl benzoate

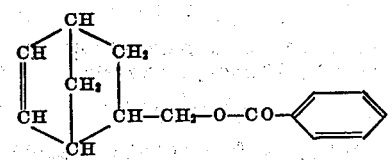

maintained at 95°–98° C., there was added dropwise 70 g. of concentrated hydrochloric acid during the course of twenty minutes. The mixture was then stirred ten minutes longer at 95° C., cooled, mixed with 500 cc. of water and the oil taken up in benzene. The benzene layer was filtered, washed, dried, and distilled in vacuo.

The product boiling at 215° C./1 mm. was a viscous, pale yellow oil having the properties of an isothiocyanate of the probable formula

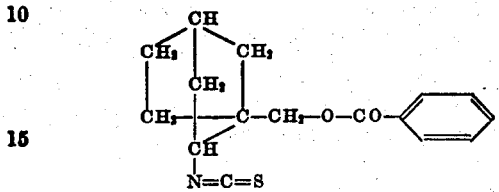

The yield of product amounted to 100 grams.

*Example 7*

A mixture of 324 g. of safrol (2 mols) and 139 g. of dicyclopentadiene (1 mol) was heated under a reflux condenser at 160°–170° C. for fifteen hours and the product then distilled in vacuo.

The desired product having the formula

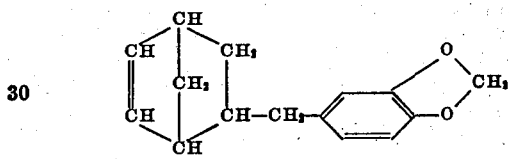

distilled over at 130°–145° C./3–4 mm. as a viscous, pale yellow oil in a yield of 180 g. The pure compound boiled at 135°–140° C./2 mm.

To a rapidly stirred, heated mixture of the above cyclopentadiene-safrol adduct (91 g.), 40 g. of water, and 40.5 g. of sodium thiocyanate, maintained at 95° C., there was added dropwise 50 g. of concentrated hydrochloric acid (35%–37% HCl) during the course of ten minutes. The mixture was stirred at 95° C. for one hour after all the hydrochloric acid had been added. The oily reaction product was taken up in benzene, the benzene solution filtered and then washed several times with water, dried, and distilled in vacuo.

The fraction boiling at 220°–230° C./2 mm. was a viscous, pale yellow oil. The yield was 86 g. Upon redistillation, it boiled at 214°–216° C./1 mm. The compound is an isothiocyanate having the probable formula

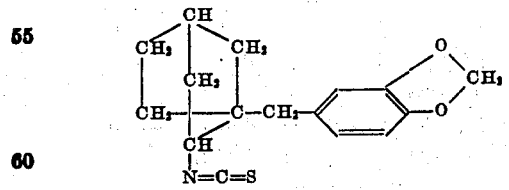

*Example 8*

A mixture of 201 g. of β-bromostyrene and 83.4 g. of dicyclopentadiene was heated under reflux at 160°–165° C. for seven hours, and the product distilled in vacuo, resulting in a compound having the formula

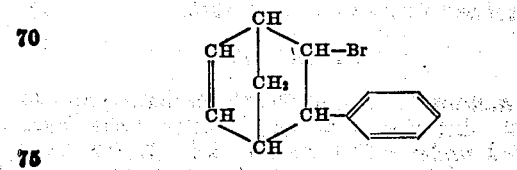

which boiled at 131°–140° C./6–7 mm. It was a pale yellow oil. The yield was 80 g.

A mixture consisting of 50 g. of the above compound, 24.3 g. of sodium thiocyanate, and 25 cc. of water was rapidly stirred and heated to 95° C. To the stirred, heated mixture, 30 g. of concentrated hydrochloric acid was added dropwise during the course of forty minutes. The oily reaction product was taken up in benzene, the benzene solution filtered, dried, and distilled in vacuo.

The product boiled at 210°–220° C./2 mm. and was an isothiocyanate. It is a viscous, pale yellow oil having the probable formula

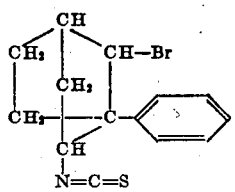

Example 9

A mixture of 139 g. of dicyclopentadiene and 190 g. of allyloxydihydronordicyclopentadiene was heated at 165°–175° C. for ten hours under reflux condenser and the product distilled in vacuo.

The compound having the formula

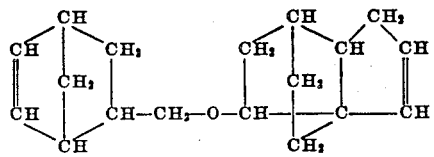

distilled over at 145°–150° C./1 mm. as a colorless, viscous oil.

A rapidly stirred mixture of 58 g. of the above compound, 24.3 g. of sodium thiocyanate, and 25 g. of water was treated at 95° C. with 30 g. of concentrated hydrochloric acid, added dropwise during fifteen minutes. The mixture was then stirred for forty minutes at 95° C. and diluted with 500 cc. of water. The oil layer was taken up in benzene, filtered, washed, dried, and distilled in vacuo. The product boiling at 197°–203° C./1 mm. was a viscous, pale yellow oil having the properties of an isothiocyanate of the probable formula

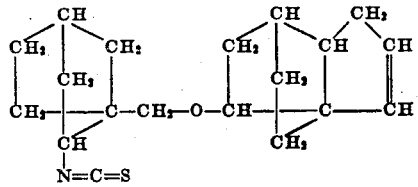

The allyloxydihydronordicyclopentadiene used above is a colorless oil boiling at 117°–119° C./12 mm. obtainable by reacting dicyclopentadiene with allyl alcohol at 90° C. in the presence of boron trifluoride or sulfuric acid as a catalyst, as described in copending patent application Serial No. 476,640, filed February 20, 1943.

Example 10

A mixture of 46 g. of dicyclopentadiene and 78 g. of allyl trichloro-(2,4,5)-phenyl ether was heated under reflux at 160°–165° C. for eight hours and the product distilled in vacuo.

The compound having the formula

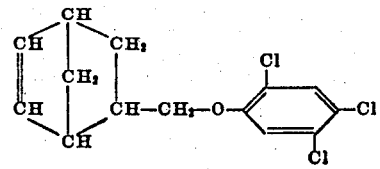

was obtained as a colorless, viscous oil boiling at 155°–160° C./1 mm.

A stirred mixture of 40 g. of the above 2,5-endomethylene - Δ³- tetrahydro-benzyl-trichlorophenyl ether, 16.2 g. of sodium thiocyanate, and 17 g. of water was treated dropwise at 95°–98° C. with 20 g. of concentrated hydrochloric acid during the course of thirty minutes. The mixture was then stirred one hour longer at 95° C. and worked up as in Example 8.

The product boiling at 235°–240° C./1 mm. was a very viscous, pale yellow oil having the properties of an isothiocyanate of the probable formula

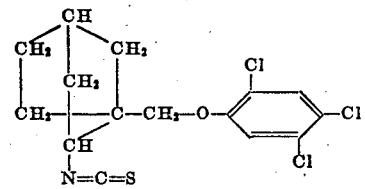

Example 11

A mixture of 104 g. of styrene and 139 g. of dicyclopentadiene was heated under reflux in the presence of 5 g. of phenyl-β-naphthylamine for seven hours at 150°–170° C., and the product distilled in vacuo.

The desired product having the formula

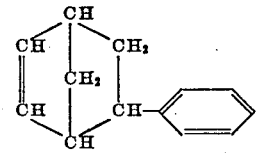

boiling at 106°–110° C./7 mm. was collected in a yield of 100 g.

To a rapidly stirred mixture of 72 g. of the above compound, 48.5 g. of sodium thiocyanate, and 50 g. of water there was gradually added 60 g. of concentrated hydrochloric acid at 90°–95° C. during the course of thirty minutes. The mixture was thereafter heated and stirred for one hour at 95° C. and worked up by filtration, washing, drying and vacuum distillation as described in the previous examples.

The isothiocyanate having the probable formula

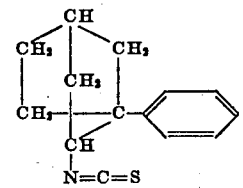

was obtained, as a pale yellow oil boiling at 159°–160° C./0.5 mm., in a yield of 77 g.

Example 12

A mixture of 86 g. of dicyclopentadiene and 173 g. of 5-ethyl-3-heptene-one-2 was boiled under reflux at 162°–172° C. for seven hours and the product distilled in vacuo. The compound having the formula

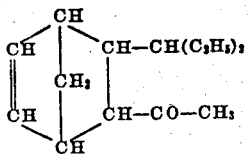

distilled over at 110°–120° C./5–6 mm. as a colorless liquid.

A mixture of 59 g. of the above compound, 28.3 g. of powdered sodium thiocyanate and 100 g. of benzene was rapidly stirred at 80°–85° C. while 35 g. of concentrated hydrochloric acid was added dropwise thereto during the course of fifteen minutes. The mixture was stirred for one hour longer at the boiling point, then washed, filtered, dried, and distilled in vacuo.

The product boiling at 170°–174° C./1 mm. was a viscous, pale yellow oil having the properties of an isothiocyanate of the probable formula

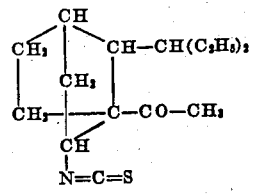

Example 13

A mixture of 200 g. of eugenol and 169 g. of dicyclopentadiene was heated under reflux for fourteen hours at 160°–165° C. and the product distilled in vacuo.

The desired compound having the formula

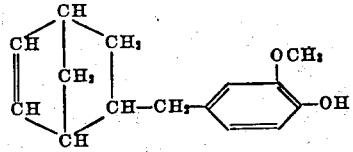

distilled over at 147°–150° C./1 mm. as a pale yellow oil which solidified to a crystalline mass.

Concentrated hydrochloric acid (30 g.) was added dropwise to a rapidly stirred mixture consisting of 48.5 g. of the above cyclopentadiene-eugenol adduct, 50 cc. of benzene, 25 cc. of water, and 24.3 g. of sodium thiocyanate maintained at 85°–90° C. The mixture was heated for ¾ hour longer at 85° C., then filtered, the benzene solution washed, dried, and distilled in vacuo.

The isothiocyanate having the probable formula

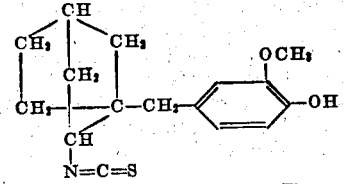

boiled at 215°–218° C./1 mm. It was a very thick oil.

Example 14

To a rapidly stirred, heated mixture of 40.5 g. of sodium thiocyanate, 50 g. of water, 50 g. of benzene, and 55 g. of 2,5-endomethylene-Δ³-tetrahydrophenol

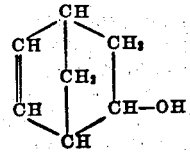

maintained at 83°–84° C. there was gradually added dropwise 50 g. of concentrated hydrochloric acid during the course of thirty minutes. The mixture was stirred for one-half hour longer at 85° C., then poured into water and the benzene layer separated, filtered, washed, dried, and distilled in vacuo.

The product boiling at 122°–125° C./0.5 mm. was a colorless oil having the properties of an isothiocyanate of the probable formula

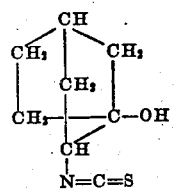

Example 15

To a stirred mixture of 30 g. of ethanol, 30 g. of water, 28 g. of sodium thiocyanate, and 61 g. of 2,5-endomethylene - Δ³ - tetrahydro dibenzyl ether

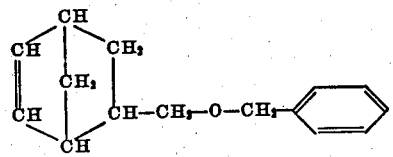

maintained at 90° C. there was added dropwise 35 g. of concentrated hydrochloric acid during the course of twenty minutes. The mixture was then stirred thereafter for one and one-half hours at 90° C. and finally washed, filtered, dried, and distilled in vacuo.

The product boiling at 184°–186° C./1.5 mm. was a pale yellow oil having the properties of an isothiocyanate of the probable formula

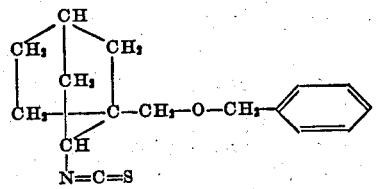

The 2,5-endomethylene-Δ³-tetrahydro-dibenzyl ether used above is a colorless liquid boiling at 114°–118° C./0.5 mm. obtainable by boiling dicyclopentadiene with allyl benzyl ether.

Example 16

A mixture of 113 g. of benzyl allyl sulfide and 96 g. of dicyclopentadiene was heated six hours at 160°–170° C. and the product distilled in vacuo. The compound boiling at 140°–150° C./1–2 mm. having the formula

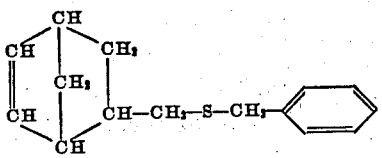

was obtained as a pale yellow oil.

A mixture of 40 g. of the above compound, 40 g. of benzene, 40 g. of water, and 16.2 g. of sodium thiocyanate was stirred rapidly at 84° C. while 20 g. of concentrated hydrochloric acid was added dropwise during fifteen minutes. The oil layer was separated, washed, filtered, dried, and distilled in vacuo.

The product boiling at 210°–215° C./0.5 mm. was a viscous, yellow oil having the properties of an isothiocyanate of the probable formula

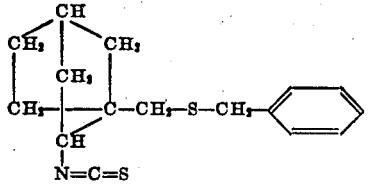

Example 17

A mixture of 136 g. of 2,5-endomethylene-Δ³-tetrahydro-6-methyl-benzaldehyde.

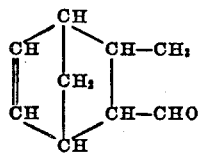

(the adduct of cyclopentadiene and crotonaldehyde), 81 g. of sodium thiocyanate, 100 g. of benzene, and 81 g. of water was rapidly stirred at 85° C. while 100 g. of concentrated hydrochloric acid was gradually added dropwise during the course of 45 minutes. The mixture was stirred thereafter for one hour longer at 87° C., then filtered, and the benzene layer washed, dried, and distilled in vacuo.

The crude product boiling at 140°–150° C./3 mm. amounted to 62 g. Upon redistillation, it boiled at 118°–124° C./0.5 mm.

Example 18

A mixture of 40 g. of 2,5-endomethylene-Δ³-tetrahydrobenzyl-sec. octyl ether.

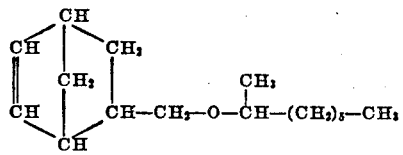

40 g. of benzene, 20 g. of water, and 16.2 g. of sodium thiocyanate was rapidly stirred at 83° C. while 20 g. of concentrated hydrochloric acid was added dropwise during ten minutes. The mixture was then stirred one hour longer at 83° C., filtered, the benzene layer separated, washed, dried, and distilled in vacuo.

The product boiling at 185°–190° C./2 mm. was a pale yellow oil amounting to 30 g. which, upon redistillation, boiled at 170°–172° C./1 mm. and possessed the properties of an isothiocyanate of the probable formula

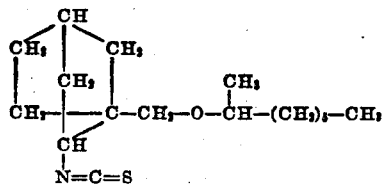

Example 19

Fifty grams of concentrated hydrochloric acid was added dropwise during one hour to a stirred boiling mixture of 90 g. of benzene, 41 g. of sodium thiocyanate, and 88.5 g. of 2,5-endomethylene-Δ³-tetrahydro-benzyloxypropionitrile

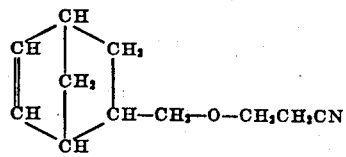

The mixture was stirred 30 minutes longer at the boiling point, then filtered and washed several times with water, dried, and distilled in vacuo.

The product boiling at 195°–205° C./1 mm. was a colorless oil weighing 70 grams which gave tests for an isothiocyanate of the probable formula

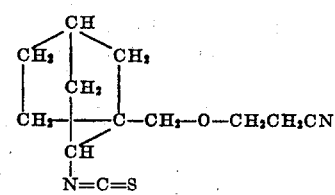

Upon redistillation, the pure compound boiled at 200°–205° C./1 mm.

The 2,5-endomethylene-Δ³-tetrahydro-benzyloxypropionitrile used above is a colorless oil boiling at 104°–108° C./1–2 mm. obtained by heating dicyclopentadiene with β-allyloxypropionitrile.

The products of this invention are isothiocyanates or mixtures containing said isothiocyanates in which the isothiocyanate group is directly attached to a carbon atom of the saturated and rearranged ring obtained from the original cycle of the cyclopentadiene.

I claim:

1. A method for preparing addition-rearrangement products of thiocyanic acid and cyclopentadiene-mono-olefinic adducts, which comprises reacting said adducts with thiocyanic acid in the presence of water, the thiocyanic acid being gradually liberated in the reaction mixture by the action of a non-oxidizing mineral acid upon a salt of thiocyanic acid.

2. As new compounds, the reaction products obtained by the addition of nascent thiocyanic acid in an aqueous medium to cyclopentadiene-mono-olefinic adducts with consequent rearrangement of the ring system of said adducts, said products comprising isothiocyanates in which the isothiocyanate group is directly attached to a carbon atom of the saturated, rearranged ring obtained from the cyclopentadiene.

3. As new compounds, addition-rearrangement products of thiocyanic acid and substances having the formula

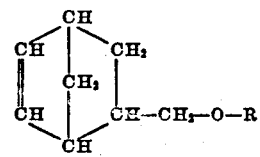

wherein R is an aromatic hydrocarbon nucleus, said products being isothiocyanates in which the isothiocyanate group is directly attached to a carbon atom of the saturated and rearranged ring obtained from the cycle supplied by cyclopentadiene in the preparation of said substances.

4. As a new compound, an addition-rearrangement product of thiocyanic acid and a substance having the formula

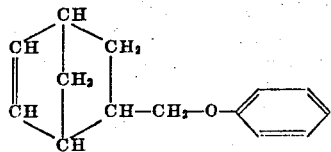

said compound being an isothiocyanate.

5. As a new compound, an addition-rearrangement product of thiocyanic acid and a substance having the formula

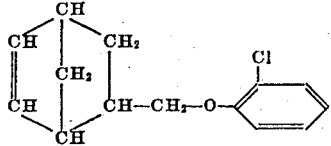

said compound being an isothiocyanate.

6. As a new compound, an addition-rearrangement product of thiocyanic acid and a substance having the formula

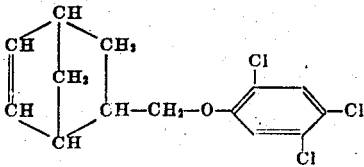

said compound being an isothiocyanate.

HERMAN A. BRUSON.